Patented Mar. 7, 1939

2,149,858

UNITED STATES PATENT OFFICE 2,149,858

VULCANIZATION ACCELERATOR AND PROCESS OF MAKING THE SAME

Charles O. Miserentino, Buffalo, N. Y., assignor to Dunlop Tire and Rubber Corporation, Buffalo, N. Y., a corporation of New York No Drawing. Application September 20, 1935, Serial No. 41,379. Renewed October 8, 1938

4 Claims. (Cl. 260—500)

My present invention relates to an accelerator of vulcanization, more particularly to an accelerator that will enable vulcanization to be accomplished at a relatively low temperature as, for example, at the temperature of boiling water.

More particularly the invention relates to an accelerator for use in making cellular rubber by a process of foaming an aqueous dispersion of rubber and thereafter vulcanizing the foamed structure.

Heretofore ultra-accelerators have been used in vulcanizing such foamed rubber structures because vulcanization is preferably accomplished at the boiling point of water, generally in contact with boiling water or steam. Many of the ultra-accelerators are not sufficiently rapid to accomplish the vulcanization of the foamed structure at the low temperatures used. Some ultra-accelerators that might be used at the temperatures desirable for the vulcanizing of a rubber foam have a tendency to break down the foam or froth of the aqueous dispersion while it is being formed, or while it is being set or jelled and thus impair or change the structure before vulcanization is possible. In many cases the presence of the accelerators heretofore available will prevent the formation of the froth or foam.

My present invention overcomes the above disadvantages and provides an accelerator which will rapidly cure the rubber froth or foam at a sufficiently low temperature such, for example, as the temperature of boiling water, and which will not impair or destroy the structure of the foamed latex.

The accelerator of my invention is a reaction product of diethyl amine, oleic acid and carbon bisulphide, in which the valence of the nitrogen has been increased from three to five. This reaction product may be combined with a metal, such as zinc, by adding a zinc salt such as zinc chloride or corresponding salts of other heavy metals, or of alkali hydroxide such as sodium or potassium hydroxide. The dithiocarbamate of any straight chain organic acid may be used, such as oleic, stearic, palmitic, lauric, caproic acids, and other acids of similar type.

The following is an example of a preferred method of forming the accelerator of my invention. 10 grams of diethyl amine are dissolved in 240 grams of water and 40 grams of oleic acid added to the solution. The mixture is stirred until the oleic acid dissolves. This will require about fifteen minutes. The reaction between the diethyl amine and the oleic acid may be represented by the following equation:

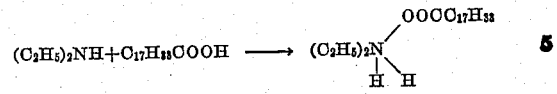

10.4 grams of carbon bisulphide are then added and the mixture stirred for an additional fifteen minutes. The reaction may be represented as follows:

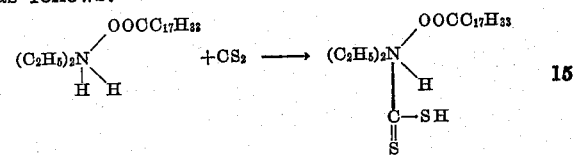

The resulting solution contains the accelerator and may be incorporated in an aqueous dispersion to be foamed and vulcanized to a permanent cellular structure. For example, the solution may be added to the aqueous rubber dispersion in the proportion of 20 grams of the solution for each 100 grams of dry rubber content in the dispersion.

Other straight chain organic acids may be substituted for oleic acid in whole or in part merely by using a weight of the acid having the same relation to the quantity of oleic acid as the relation of their molecular weight, it being understood that when acids of lower molecular weight are employed, a proportionately lower weight may be used when substituted for oleic acid.

It will also be understood that diethyl amine has been mentioned merely by way of example of a secondary amine useful in the process, but it will be understood that other secondary amines, such as dimethyl amine or dipropyl amine might be used in place of diethyl amine. To form the corresponding metallic salt, it is merely necessary to add zinc chloride or other salt, or to add a suitable hydroxide such as sodium or potassium hydroxide.

What I claim is—

1. The vulcanization accelerator of the formula—

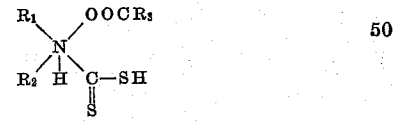

where $R_1$, $R_2$ and $R_3$ are alkyl radicals.

2. The vulcanization accelerator of the formula—

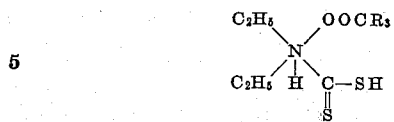

where $R_3$ is an aliphatic radical.

3. The method of making a vulcanization accelerator which comprises reacting diethyl amine with oleic acid, and reacting the resulting product with carbon bisulphide.

4. The method of making a vulcanization accelerator which comprises stirring oleic acid into an aqueous solution of diethyl amine until the oleic acid dissolves therein, and then stirring into the resulting solution carbon bisulphide until it dissolves therein.

CHARLES O. MISERENTINO.